G. R. Scriven,
Hanging Saws,
No. 17,521. Patented June 9, 1857.
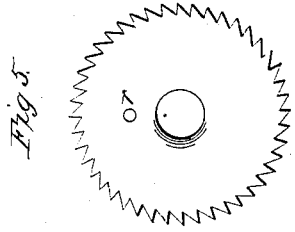
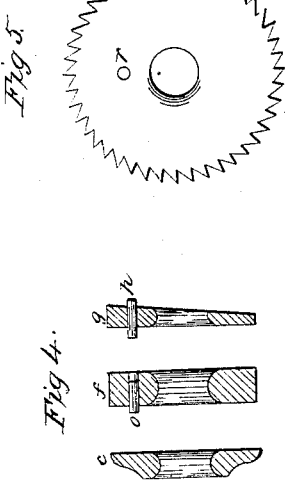
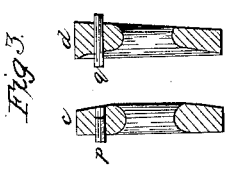
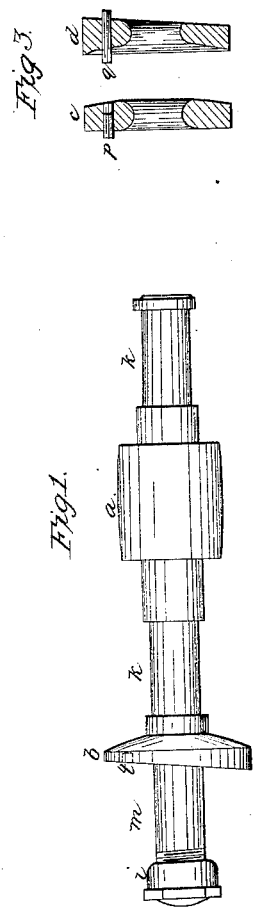
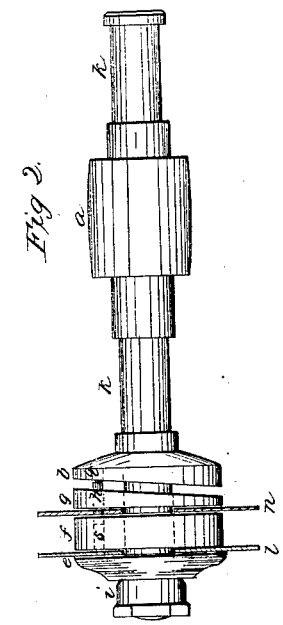
Witnesses:
Inventor:

UNITED STATES PATENT OFFICE.

G. R. SCRIVEN, OF PHILADELPHIA, PENNSYLVANIA.

METHOD OF ADJUSTING CIRCULAR SAWS OBLIQUELY TO THEIR SHAFTS.

Specification of Letters Patent No. 17,521, dated June 9, 1857.

*To all whom it may concern:*

Be it known that I, GARDNER R. SCRIVEN, of the city of Philadelphia, in the county of Philadelphia and State of Pennsylvania, have invented a new and useful Improvement in the Adjustment of Circular Saws for Cutting Tongues and Grooves in Lumber of Any Desired Width and Depth; and I do hereby declare the following to be a full and exact description thereof, reference being had to the accompanying drawings and to the letters of reference marked thereon.

Figure 1 in the accompanying drawings is a view of my improved spindle in perspective, and in which $k$ $k$ are the journals, $a$ the pulley, $b$, the fixed collar, $m$ the projecting portion of the spindle to receive the saws, and $i$, the nut. Fig. 2 is a similar view of the spindle, with the addition of an adjustable beveled collar $g$, a plane movable collar $f$ of uniform lateral thickness, the nut collar $e$, and the two saws $l$ and $n$, shown in vertical sections through their center at the point of contact with the spindle. All these collars are of a uniform diameter with the fixed collar $b$. Fig. 3 shows in vertical section a concave beveled collar $d$, and a plane convex collar $c$. These collars are of uniform diameter with the fixed collar $b$, and slide easily upon the spindle $m$, Fig. 1. Fig. 4 shows the collars $g$, $f$, and $e$ (Fig. 2) in vertical sections divided respectively through their center. Fig. 5 is a face view of the circular saws used for cutting straight grooves.

I will now describe the mode of constructing my circular saw spindle and the various parts thereof.

The fixed collar $b$, (Fig. 1) is constructed of iron, in proportions varied according to the strength required, and is beveled on its outer or front face. The amount of bevel for all ordinary purposes should be one fourth of an inch. This collar may be forged, pressed or shrunk upon the spindle in the usual way, as the case may be.

$g$, in Fig. 2, is a plain beveled collar, its rear surface facing the fixed collar, beveled, and its front surface perpendicular to the axis of the spindle. This collar should be also made of iron, the quantity of bevel exactly corresponding with that of the fixed collar $b$, and its maximum thickness one half of an inch, and its minimum thickness one fourth of an inch. The extremes of this collar are shown in the figure opposite and the maximum and minimum points thereof on the rim marked by a vertical slot, and are in the same line with the opposite extremes of the fixed collar $b$, so that when brought in contact with the fixed collar $b$, its plain or front surface is perpendicular to the spindle, while its opposite surface is inclined at an angle with the spindle. $h$ in this collar is a small sliding pin about one eighth of an inch in diameter which slides easily in a hole drilled through the collar perpendicular to the plane surface and which when the collar in the present relative position is pressed against the fixed collar $b$, enters a similar hole drilled opposite in the fixed collar $b$, and nearly through the same. When in this position its office is to prevent the collar $g$ from turning on the spindle. In length this pin will depend upon conditions hereinafter specified. This collar is shown in the figure separated from the collar $b$. $f$ is a plane collar of from one half to one inch in lateral thickness, but for all ordinary purposes three fourths of an inch is sufficient, and may be constructed of wood or iron. It also is provided with the sliding pin $s$, the office of which will be hereinafter described. In Fig. 4 these sliding pins are shown in the collars respectively. $e$ is the outer or nut collar constructed in all respects similar to those in common use on saw spindles, with the exception that at the point of contact with the nut $i$ on its outer surface it is constructed with a concave recess. All these three collars $e$, $f$ and $g$ (Fig. 2) and $c$ and $d$ (Fig. 3) are chamfered down and inward toward the center of each from front and rear surface at the point of contact with the spindle, reducing the same to a line on the spindle. This is shown in Figs. 3 and 4. These collars all slide easily upon the spindle $m$ (Fig. 1) and from what has been just stated may be readily inclined at an angle with the spindle, which should at least be equal to the amount of bevel in the fixed collar $b$, and at the same time will fit on the spindle sufficiently snug so as not to chuck or jar.

$i$ is a convex surfaced nut, the convex surface projecting toward and fitting easily into the concave recess in the collar $e$, and with it forming a ball and socket joint, so that when the collar $e$ is inclining at an angle with the spindle it has a uniform bearing with the nut.

The convex collar $c$ (Fig. 2) is made of iron or some firm wood, one half inch in thickness if of iron, or about three fourths of an inch if of wood. Its convexity has a radius of four feet for ordinary purposes. $d$ in the same figure is also constructed of iron or some firm wood and in thickness similar to the collar $c$. Its concavity has a radius of four feet and one eighth of an inch. The amount of bevel in its outer surface exactly corresponds with the bevel of the fixed collar $b$ (Figs 1 and 2) in quantity. The object of these collars will be hereinafter stated as well as their sliding pins $p$ and $q$.

In Fig. 5 is shown a face view of the saws used in grooving and tonguing timber. I construct them of one eighth of an inch saw plate steel and of eight and one half inches in diameter, with three right angled triangle teeth to the inch, which are filed straight across and used without set.

$r$ is a hole drilled through the saw.

If now, from what has been stated, the nut $i$ (Fig. 3) is tightened, the outer ends of the spindle $m$ (Fig. 1) being constructed with a screw thread, to receive the nut $i$, it is plain that the collars $e$, $f$, and $g$ will all be forced toward the fixed collar $b$, and the adjustable beveled collar $g$ will be pressed against the fixed collar $b$, the beveled face of each in contact, and which being the same in quantity, the plane face of the beveled collar $g$, the saws $l$ and $n$, and the collars $f$ and $e$ will as a consequence be perpendicular to the axis of the spindle, and the sliding pin $h$, in the adjustable collar $g$, will pass into the fixed collar $b$, it being of sufficient length will if desired also pass into the hole $r$ (Fig. 5) of the saw $n$. The length of this pin is equal to the thickness of the collar $g$, and the thickness of the two saw plates $l$ and $n$. If now the nut $i$ (Fig. 2) be again loosened, and the sliding pin drawn out from the collar $b$, and the collar $g$, be turned right or left on the spindle, and the whole pressed against the beveled face of the fixed collar $b$, and the nut tightened, the pin $h$ will project through the saw $n$ in the hole $r$ (Fig. 5) and into the sliding pin hole $s$ (which in length is equal to the thickness of the collar $f$) and forcing the same into a similar hole in the saw $l$, so that any variation in the adjustable collar $g$, the saws $l$ and $n$, or the plane collar $f$, is distributed at once, and uniformly throughout the whole, being all connected together by the pins $s$ and $h$. It is also evident from what has been already stated that all the collars with the two saws $l$ and $n$ have the same inclination to the spindle, and that the collar $e$ still has a firm and uniform bearing with the nut $i$, through the ball and socket joint heretofore described, at their point of contact, and as a consequence the two saws $l$ and $n$ are firmly held in their slanting or inclined position. If now the spindle be rapidly rotated and timber be placed in contact with the saws, it will be observed that the quantity of timber displaced by the saws exceeds the thickness of the plates of each, and that the saws have a zigzag or wabbling motion. If the nut $i$ is again loosened and the collar $g$ is still further turned on the spindle and the nut again tightened, the saws will be still more inclined to the spindle, and when set in motion will be found to displace a larger amount of the timber, and the undisplaced timber between the two saws will be proportionally diminished. From the foregoing, it is plain that by varying the adjustable beveled collar $g$, the width of the timber displaced and the space uncut between the two saws can be readily varied at pleasure. If now the spindle (Fig. 2) be placed in an ordinary circular saw frame having an elevating and depressing table and set revolving on its axis and the edge of a plank is run over the top of the saws on the table, it is plain there will be two displacements of the wood—that is two grooves and a space uncut between them, or in other words two grooves and one tongue will be cut, unless the thickness of the plank is exactly equal or less than the wabble of the saws, when it would be a tongue. The office of the collar $f$ is thereby to place the two saws asunder on the spindle, so as to leave an intervening space uncut between the saws. This space can be increased or diminished at pleasure by turning the collar $g$. By removing the saw $l$, a single groove would be cut, and one saw is capable of cutting a groove of one inch in width. Beyond this I use two or more saws, as the case may be, separated by the collar $f$ wabbled so as to leave no intervening timber remaining.

The saws in practice have been ascertained to cut at the base in a circle and not square, in consequence of all the teeth not being equidistant from the axis of motion, which has hitherto rendered the use of wabbling circular saws for grooving and tonguing of little value. I obviate this defect by approximating the saws $l$ and $n$ on the spindle to the extreme amount of wabble required in ordinary practice, and while in this position race them down to an apparent true circle and uniform in both.

When I desire to cut circular or curved grooves, I place the collar $d$, Fig. 3, on the spindle $m$, Fig. 1, with its beveled surface forcing the beveled surface of the fixed collar $b$, and place on the spindle an ordinary concave or dishing circular saw, and next to the convex collar $c$, and tighten the nut $i$. The amount of wabble is regulated in this case as heretofore described in cutting straight grooves, and to tongue I place on the spindle a second dishing saw, as already described in reference to cutting straight tongues in which case instead of the plane collar $f$ (Fig. 2) I use a concavo-convex collar. The office of the sliding pins $p$ and $q$ is the same in this case as already described in reference to the sliding pins $s$ and $h$, Fig. 2.

I construct the spindle $m$, Fig. 1, about five inches in length measured outward from the plane surface of the adjustable collar $g$, when its plane surface is vertical to the spindle, which is always the case when the sliding pin $h$ is projected into the fixed collar as heretofore stated.

I calculate the amount of wabble necessary to cut any required groove by measuring from either surface of the saw opposite one half the distance of the required groove in width, and place a guide or other flat surface in a plane vertical to the uppermost tooth in the saw, distant from the opposite face of the saw when vertical to the spindle one half of the required width of the groove, and then turn the saw $n$, with the collar $g$ on the spindle until the uppermost tooth comes in contact with the guide. I then tighten the nut and the saw will be found to cut exactly the required groove. The depth of the groove when the spindle is horizontal is regulated by the elevation or depression of the table. I regulate the width and depth of tongues in a similar manner.

In grooving and tonguing I use an ordinary guide to conduct the lumber properly over the saw, and for curved or circular work. The guide is cut into the shape of the required groove or tongue and tacked down or otherwise secured in its required position on the table. This plan of guides is in general use with the ordinary "dishing" or concave saw.

One great advantage of the construction of the spindle with a fixed beveled collar and the connection of the saw to a single movable beveled collar by a pin lies in the obviating of a difficulty of adjustment existing where two movable washers are employed. This difficulty is as follows: On loosening the securing nut gravity will at once carry the thick portions of both washers to the under side of the shaft and render the removal of the table necessary before adjustment can be effected. This difficulty when contrasted with the ease of turning my single collar by the hand applied to the saw renders my invention of great practical value.

I do not claim the use of oblique circular saws for cutting grooves, as such are well known. Neither do I claim the employment of two beveled washers between a fixed collar on the spindle and the circular saw, as that mode of adjustment presents disadvantages herein set forth; but What I do claim as new and of my own invention, is—

1. The combination of the stationary beveled collar on the spindle with the single loose collar having one beveled face, and the sliding pin connecting said loose collar with the saw; the arrangement and operation being as hereinbefore set forth.

2. The plane faced collar $f$ fitting the spindle in such a manner as to be easily inclined at an angle with the spindle, between two circular saws $l$ and $n$ for cutting tongues and wide grooves in lumber as described.

3. The sliding pin $h$ in the collar $g$, and sliding through the same into the fixed collar $b$, or through the saw $n$, and into the collar $f$ (Fig. 2) as the case may be for the purposes herein stated.

G. R. SCRIVEN.

Witnesses:
 JAS. D. CLARY,
 GEO. PATTEN.